United States Patent
Oyama et al.

(10) Patent No.: US 10,710,241 B2
(45) Date of Patent: Jul. 14, 2020

(54) CONTROLLER FOR LIMITING SPEED OF ROBOT COMPONENT

(71) Applicant: FANUC CORPORATION, Yamanashi (JP)

(72) Inventors: Takumi Oyama, Yamanashi (JP); Tomoyuki Yamamoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 84 days.

(21) Appl. No.: 16/133,704

(22) Filed: Sep. 18, 2018

(65) Prior Publication Data

US 2019/0105775 A1   Apr. 11, 2019

(30) Foreign Application Priority Data

Oct. 5, 2017  (JP) .................. 2017-195325

(51) Int. Cl.
*B25J 9/16* (2006.01)
*B25J 13/08* (2006.01)
*G05B 19/042* (2006.01)

(52) U.S. Cl.
CPC .......... *B25J 9/1666* (2013.01); *B25J 9/1635* (2013.01); *B25J 9/1676* (2013.01); *B25J 9/1694* (2013.01); *G05B 19/042* (2013.01)

(58) Field of Classification Search
CPC ...... B25J 9/1666; B25J 9/1676; B25J 9/1694; B25J 9/1635; B25J 13/088; B25J 13/00; B25J 9/1674; B25J 9/1664; G05B 19/042
USPC ....................................... 700/245
See application file for complete search history.

(56) References Cited

U.S. PATENT DOCUMENTS

| | | | | |
|---|---|---|---|---|
| 4,260,941 A | * | 4/1981 | Engelberger | B23P 21/002 318/568.13 |
| 5,737,500 A | * | 4/1998 | Seraji | B25J 9/1643 318/568.11 |
| 10,369,691 B2 | * | 8/2019 | Yamazaki | B25J 9/0087 |
| 10,556,353 B2 | * | 2/2020 | Su | B25J 9/12 |
| 2005/0166413 A1 | * | 8/2005 | Crampton | B25J 13/088 33/503 |
| 2006/0145647 A1 | * | 7/2006 | Kitatsuji | B25J 9/1682 318/568.11 |
| 2009/0000136 A1 | * | 1/2009 | Crampton | B25J 13/088 33/503 |
| 2010/0191372 A1 | * | 7/2010 | Nihei | F16P 1/00 700/245 |

(Continued)

FOREIGN PATENT DOCUMENTS

| | | |
|---|---|---|
| CN | 106607904 A | 5/2017 |
| JP | H9-85656 A | 3/1997 |

(Continued)

*Primary Examiner* — Jaime Figueroa
(74) *Attorney, Agent, or Firm* — Hauptman Ham, LLP

(57) ABSTRACT

A controller includes a stop command unit for stopping the motion of the robot when a person comes into contact with the robot, and a speed limiting unit for limiting the operation speed of the component driven on the drive axis. A variable calculated from the position of the component on the drive axis and the range of the variable in a state where the person is caught by the robot are determined in advance. The speed limiting unit acquires the variable from the output of a position detector and controls the operation speed of the component to a predetermined speed limit or lower if the variable is within the range.

5 Claims, 13 Drawing Sheets

(56) References Cited

U.S. PATENT DOCUMENTS

| | | | |
|---|---|---|---|
| 2010/0286826 A1* | 11/2010 | Tsusaka | B25J 9/1633 700/254 |
| 2011/0190932 A1* | 8/2011 | Tsusaka | B25J 13/08 700/254 |
| 2014/0039517 A1* | 2/2014 | Bowling | B25J 9/161 606/130 |
| 2014/0039681 A1* | 2/2014 | Bowling | A61B 34/74 700/261 |
| 2015/0148954 A1* | 5/2015 | Sasaki | B25J 9/163 700/250 |
| 2015/0158178 A1 | 6/2015 | Burmeister et al. | |
| 2015/0209961 A1* | 7/2015 | Komatsu | B25J 9/1676 700/255 |
| 2015/0250547 A1* | 9/2015 | Fukushima | A61B 1/04 606/130 |
| 2017/0007336 A1* | 1/2017 | Tsuboi | B25J 9/1674 |
| 2017/0080574 A1* | 3/2017 | Kuroda | B25J 9/1641 |
| 2017/0190049 A1* | 7/2017 | Wada | B23K 9/12 |
| 2017/0210008 A1* | 7/2017 | Maeda | B25J 9/1682 |
| 2018/0079090 A1* | 3/2018 | Koenig | G16H 40/63 |

FOREIGN PATENT DOCUMENTS

| | | |
|---|---|---|
| JP | H11-123690 A | 5/1999 |
| JP | 2000-6065 A | 1/2000 |
| JP | 2010-188515 A | 9/2010 |
| JP | 2015-30078 A | 2/2015 |
| JP | 2017-77608 A | 4/2017 |
| JP | 2017-177321 A | 10/2017 |
| WO | 2014/048444 A1 | 4/2014 |
| WO | 2017/094240 A1 | 6/2017 |

* cited by examiner

CONTROLLER FOR LIMITING SPEED OF ROBOT COMPONENT

RELATED APPLICATIONS

The present application claims priority of Japanese Patent Application No. 2017-195325, filed on Oct. 5, 2017, the disclosure of which is hereby incorporated by reference herein in its entirety.

BACKGROUND OF THE INVENTION

1. Field of the Invention

The present invention relates to a controller for limiting the speed of a robot component.

2. Description of the Related Art

In the related art, for the safety of an operator, some measures have been applied in order to prevent an operator from entering a region around a robot during the operation period of the robot. For example, a safety fence is installed around a robot and limits the entry of the operator inside the safety fence during the operation period of the robot. Recently, a robot device that allow collaboration between the operator and the robot is known.

In the robot device that allows collaboration with the operator, the robot can perform a task with the operator without the safety fence around the robot. Alternatively, the task of the robot can be transferred as a subsequent task to the operator.

When the operator works in the operation range of the robot, a robot arm or the like may come into contact with the operator or the operator may be caught by the robot arm. In the related art, a robot control for ensuring the safety of the operator is known (For example, Japanese Unexamined Patent Publication No. 2000-6065A and Japanese Unexamined Patent Publication No. 9-85656A).

Moreover, a control for limiting the maximum rotation speed of the robot under a predetermined condition such as singular points where a plurality of robot postures can be selected for a robot position is known (For example, Japanese Unexamined Patent Publication No. 2015-30078A).

SUMMARY OF THE INVENTION

A robot device that perform an operation in collaboration with an operator can have the function for stopping a robot when the robot comes into contact with the operator. The influence on the operator can be suppressed by stopping the robot. For example, when robot arms are operated, the operator's hand may be caught between the arms. A robot controller can stop the motion of the arms by detecting contact between the robot and the operator.

However, from the time of issuance of a stop command for the robot to the time of complete stop of the robot, the robot moves by inertia. For example, when the orientation of the arm is changed, the arm is not immediately stopped in response to the issuance of the stop command. The arm is stopped after moving a predetermined distance by the inertia. Thus, if the operator is caught by the components of the robot, the operator is continuously pressed in a period corresponding to the distance by the inertia after the issuance of the stop command for the robot. Moreover, the robot is moved by inertia so as to reduce a space where the operator may be caught. As a result, there was the problem that the operator is strongly pressed further in a period during which the robot is moved by inertia.

An aspect of the present disclosure is a controller for controlling a robot that has a drive axis for driving a component of the robot and includes a position detector that detects a position on the drive axis. The controller includes a stop command unit that stops the motion of the robot when a person comes into contact with the robot, and a speed limiting unit that limits an operation speed of the component driven on the drive axis. A variable that is calculated from the position of the component on the drive axis and the range of the variable for a state where the person is caught by the robot or an operation tool attached to the robot are determined in advance. The speed limiting unit acquires the position of the component on the drive axis from the output of the position detector, acquires the variable based on the position of the component, and controls the operation speed of the component to a predetermined speed limit or lower if the variable falls within the range.

DETAILED DESCRIPTION

Referring to FIGS. 1 to 16, a controller for a robot according to an embodiment will be described below. The robot of the present embodiment is a robot that is capable of performing an operation in collaboration with an operator. Such the robot that is capable of performing an operation in collaboration with the operator is referred to as a collaborative robot.

Figure 1:
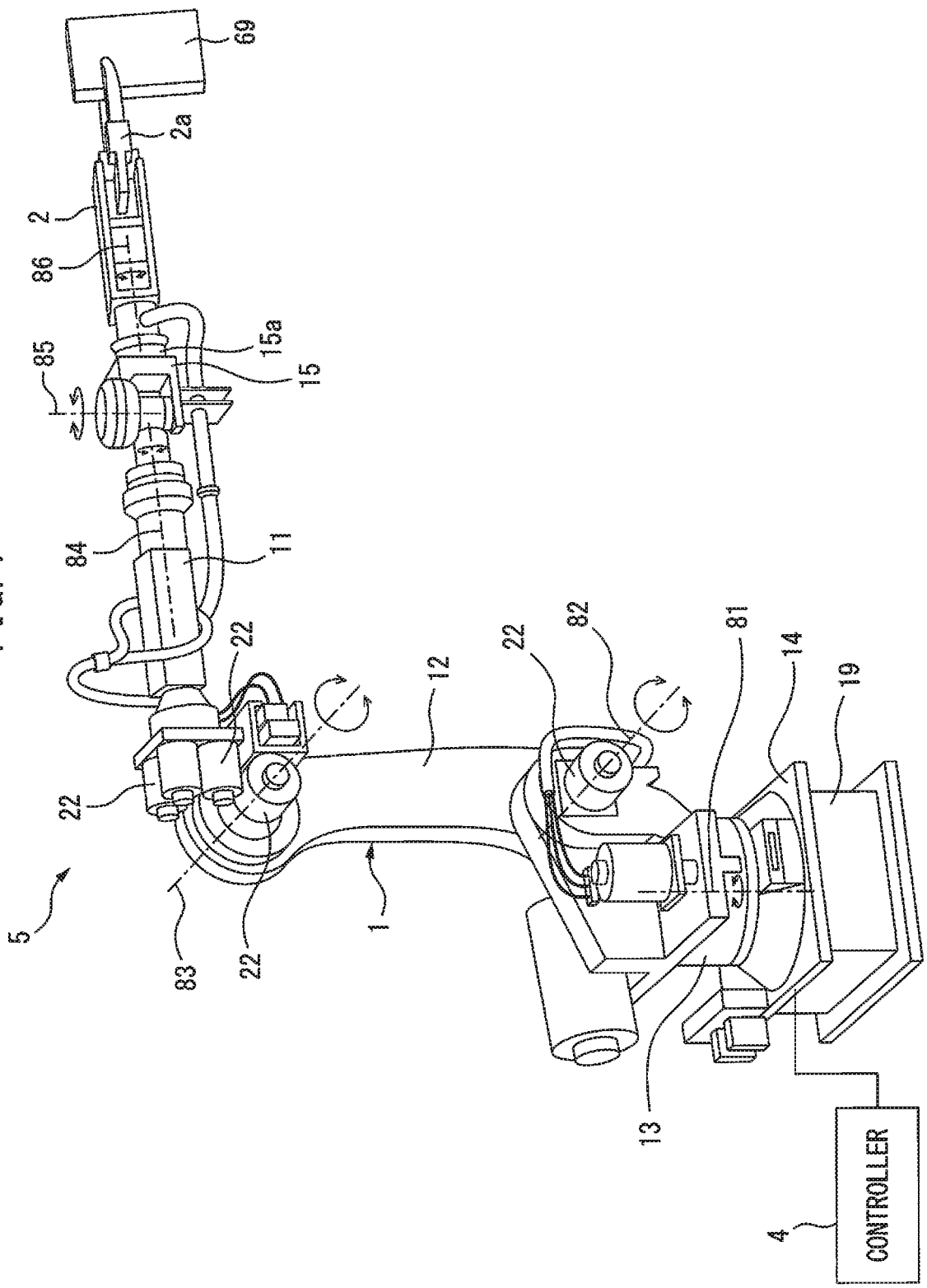
FIG. 1 is a schematic perspective view showing a first robot device according to an embodiment.

FIG. 1 is a perspective view showing a first robot device according to the present embodiment. A first robot device 5 includes a robot 1 and a hand 2. The robot device 5 includes a controller 4 that controls the robot 1 and the hand 2. The robot 1 of the present embodiment is an articulated robot including a plurality of joints. In the articulated robot, the orientations of arms and wrists are changed at the joints.

The hand 2 is an operation tool that grips and releases a workpiece 69. The operation tool is also referred to as an end effector. The hand 2 is formed so as to open and close claws 2a. The operation tool is not limited to the hand 2. Any tool can be used for a task performed by the robot device 5. For example, an operation tool for gripping a workpiece by suction or an operation tool for painting may be used.

The robot 1 of the present embodiment includes a plurality of drive axes for driving the components of the robot 1. The drive axes of the robot 1 include six rotary axes 81 to 86, from the first rotary axis 81 (J1 axis) to the sixth rotary axis 86 (J6 axis). The robot 1 includes a base 14 serving as a pedestal and a rotation base 13 supported by the base 14. The rotation base 13 is formed so as to rotate relative to the base 14. The rotation base 13 rotates about the first rotary axis 81 serving as the J1 axis.

The robot 1 of the present embodiment includes a plurality of arms. The robot 1 includes an upper arm 11 and a lower arm 12. The lower arm 12 is supported by the rotation base 13. The upper arm 11 is supported by the lower arm 12. The lower arm 12 rotates about the second rotary axis 82 serving as the J2 axis. The lower arm 12 is formed so as to rotate relative to the rotation base 13. The upper arm 11 rotates about the third rotary axis 83 serving as the J3 axis. The upper arm 11 is formed so as to rotate relative to the lower arm 12.

One end of the upper arm 11 rotates about the fourth rotary axis 84 serving as the J4 axis. The robot 1 includes a wrist 15 connected to the end of the upper arm 11. The wrist 15 rotates about the fourth rotary axis 84. The wrist 15 further includes a flange 15a that fixes the hand 2 on one end of the flange 15a. The flange 15a rotates about the fifth rotary axis 85 serving as the J5 axis. Moreover, the flange 15a rotates about the sixth rotary axis 86 serving as the J6 axis. In this way, the position and posture of the robot 1 are changed based on the drive axes of J1 to J6.

Figure 2:
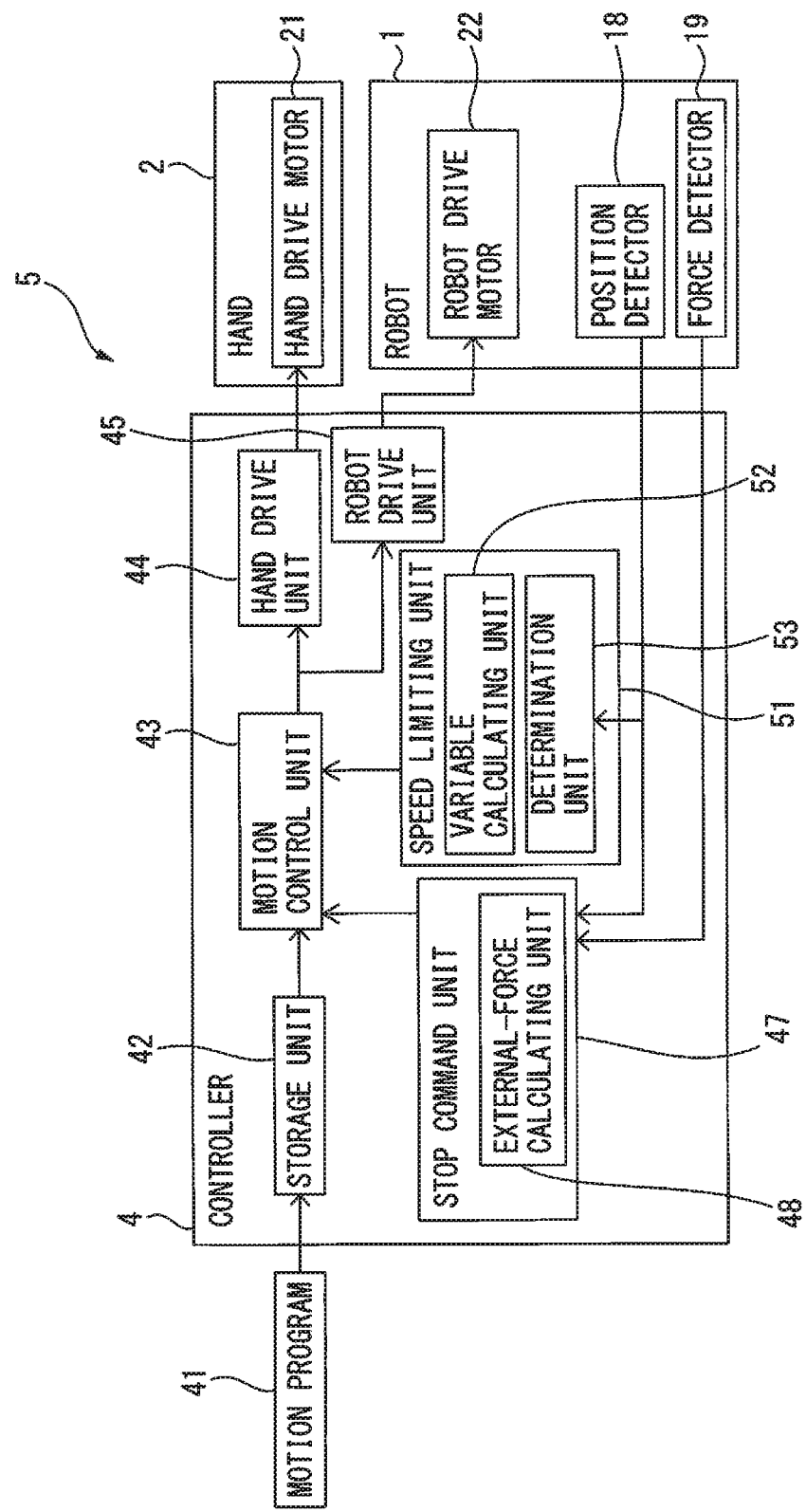
FIG. 2 is a block diagram showing a first robot device.

FIG. 2 is a block diagram showing the robot device according to the present embodiment. Referring to FIGS. 1 and 2, the robot 1 includes a robot drive device that changes the position and posture of the robot 1. The robot drive device drives the components of the robot. The components driven by the robot drive device include the upper arm 11, the lower arm 12, the rotation base 13, the wrist 15, and the flange 15a of the wrist 15. The robot drive device includes robot drive motors 22 that drive the components. In the present embodiment, the robot drive motors 22 are disposed for the respective drive axes. The robot drive motors 22 are driven so as to changes the orientations of the components. For example, the robot drive motor 22 includes a motor disposed in the joint corresponding to the third rotary axis 83. This motor is driven, whereby, for example, the upper arm 11 can be oriented in a desired direction.

The robot device includes a hand drive device that drives the hand 2. The hand drive device includes a hand drive motor 21 that drives the claws 2a of the hand 2. The claws 2a of the hand 2 are opened and closed by driving the hand drive motor 21. The hand may be formed so as to be driven by air pressure. In this case, the hand drive device can include an air pump or the like for supplying compressed air to the hand.

The robot device 5 of the present embodiment transfers the workpiece 69 based on a motion program 41. The robot 1 can automatically transfer the workpiece 69 from an initial position to a target position based on the motion program 41.

The controller 4 of the robot device 5 is composed of an arithmetic processing unit (computer) including a central processing unit (CPU), random access memory (RAM), and read only memory (ROM) that are connected to the CPU via a bus. The motion program 41 generated in advance for a motion of the robot 1 is inputted to the controller 4. The motion program 41 is stored in a storage unit 42. A motion control unit 43 transmits a motion command for driving the robot 1 to a robot drive unit 45 based on the motion program 41. The robot drive unit 45 includes an electric circuit that drives the robot drive motor 22. The robot drive unit 45 supplies electric power to the robot drive motor 22 based on the motion command. The robot drive motor 22 is driven so as to change the position and orientation of the robot 1.

Moreover, the motion control unit 43 transmits a motion command for driving the hand 2 to a hand drive unit 44 based on the motion program 41. The hand drive unit 44 includes an electric circuit that drives the hand drive motor 21. The hand drive unit 44 supplies electric power to the hand drive motor 21 based on the motion command. The hand drive motor 21 is driven so as to drive the claws 2a of the hand 2. The hand 2 can grip and release the workpiece 69.

The robot 1 of the present embodiment conducts an operation in collaboration with the operator. The controller 4 is formed so as to stop the motion of the robot 1 when a person such as the operator, comes into contact with the robot 1. The robot 1 of the present embodiment includes a force detector 19 that detects a force applied to the base 14. The force detector 19 is fixed to an installation surface. The base 14 is supported by the force detector 19. The force applied to the base 14 corresponds to a force applied to the robot 1. The force detector 19 outputs a signal corresponding to the force from the operator.

The force detector 19 may be any detector that is capable of detecting the magnitude of the force applied to the robot 1 and the direction of the force. The force detector 19 of the present embodiment includes a metallic base member connected to the base 14 and a distortion sensor attached to a surface of the base. Moreover, the force detector 19 can calculate a force applied to the robot 1 based on a deformation amount detected by the distortion sensor.

The robot 1 includes a status detector that detects the position and posture of the robot 1. The status detector of the present embodiment includes a position detector 18 that is attached to the robot drive motor 22 corresponding to each of the drive axes. The position of the component of the drive axis can be acquired by the output of the position detector 18. For example, the position detector 18 detects a rotation angle when the robot drive motor 22 is driven. Moreover, the position detector 18 can calculate the rotation speed of the robot drive motor 22 based on the rotation angle of the robot drive motor 22.

The controller 4 includes a stop command unit 47 that stops the motion of the robot when the person or an object other than the robot comes into contact with the robot. The stop command unit 47 transmits the command for stopping the robot 1 to the motion control unit 43. The stop command unit 47 includes an external-force calculating unit 48 that estimates an external force applied to the robot 1 from the outside of the robot 1. The force detected by the force detector 19 includes an internal force generated by the mass of the robot 1 and a motion of the robot 1 and an external force applied to the robot 1 from the outside of the robot 1.

The external-force calculating unit 48 calculates an internal force applied to the robot 1 by the weight of the robot 1 when the robot 1 is operated in the absence of the external force applied to the robot 1. The internal force can be calculated based on the position and posture of the robot 1, which are detected by the position detector 18, the mass of the component such as the arm of the robot 1, and the mass of the hand 2. The position and posture of the robot 1 are detected based on the output of the position detector 18. The masses of the components of the robot 1 and the mass of the hand 2 can be stored beforehand in the storage unit 42. The external-force calculating unit 48 calculates the external force by subtracting the internal force from the force detected by the force detector 19. The external force corresponds to the force applied to the robot by the operator and the like.

If the external force is larger than a predetermined judgement value, it can be determined that the person has come into contact with the robot 1. The stop command unit 47 transmits the command for stopping the robot 1 to the motion control unit 43 if the external force is larger than the predetermined judgement value. The motion control unit 43 stops the operation of the robot 1. Specifically, the motion control unit 43 stops all the robot drive motors 22 and the hand drive motor 21 during the driving of the motors. In this way, the robot device 5 of the present embodiment automatically stops if the person or the object comes into contact with the robot 1 during the operation period of the robot 1.

The controller 4 of the present embodiment determines that the operator or the like has come into contact with the robot 1 by detecting the external force applied to the robot 1, but the embodiment is not limited to this. The controller can detect the contact with the operator or the like by any configuration and control. For example, a contact sensor for detecting contact with the object may be disposed on the outer surface of the robot so as to detect the contact with the operator or the like based on the output of the contact sensor.

Figure 3:
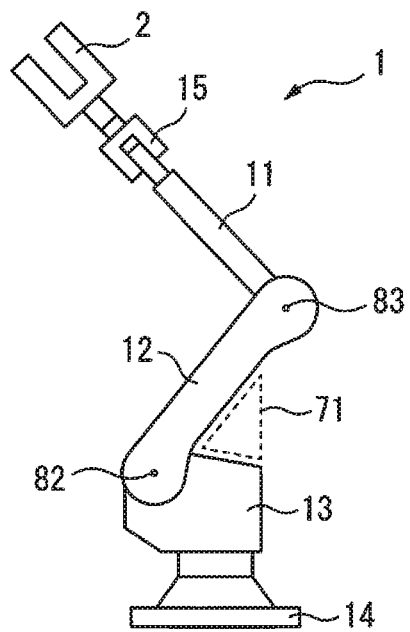
FIG. 3 is a first schematic side view showing a robot in the first robot device according to the embodiment.
Figure 4:
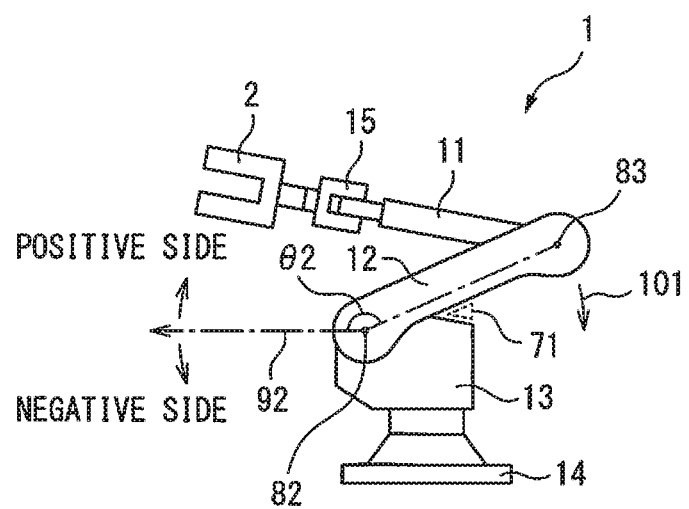
FIG. 4 is a second schematic side view showing the robot in the first robot device.
Figure 5:
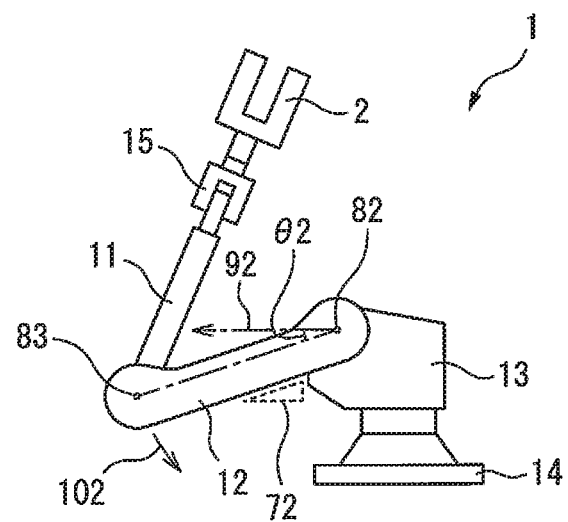
FIG. 5 is a third schematic side view showing the robot in the first robot device.

FIG. 3 is a first schematic side view showing the robot in the first robot device according to the present embodiment. FIG. 4 is a second schematic side view showing the robot in the first robot device. FIG. 5 is a third schematic side view showing the robot in the first robot device. When the robot 1 is driven, the operator may conduct a task near the robot 1. During the driving of the robot 1, a hand or a foot of the operator may be caught by the components of the robot 1.

The components of the robot 1 which may catch the person include any members constituting the robot 1. For example, the components include the base 14, the rotation base 13, the lower arm 12, the upper arm 11, and the wrist 15. Furthermore, the components include a linear member such as an electric cable, a connector for electrical connection, a robot drive motor, a hand drive motor, and the like.

In a first example, the operator is caught by the robot 1 when the lower arm 12 is driven on the second rotary axis 82 serving as the J2 axis. Whether the operator is caught by the robot 1 or not depends on the angle between the two components connected to the single rotary axis. In the example of FIG. 3, the lower arm 12 is directed upward and thus if the operator inserts a hand into region 71 between the rotation base 13 and the lower arm 12, the hand is not caught between the rotation base 13 and the lower arm 12.

However, as shown in FIG. 4, when the lower arm 12 pivots about the second rotary axis 82 as indicated by arrow 101, the angle between the rotation base 13 and the lower arm 12 may decrease. In this case, the hand of the person is liable to caught in the region 71. FIG. 5 shows that the lower arm 12 has pivoted oppositely from the state of FIG. 4. When the lower arm 12 pivots about the second rotary axis 82 as indicated by arrow 102, the region 72 between the rotation base 13 and the lower arm 12 is reduced, whereby the hand of the person may be caught in the region 72.

In a first control of the present embodiment, as shown in FIGS. 4 and 5, the controller 4 controls the operation speeds of the components of the robot 1 to a predetermined speed limit or lower in a state where the hand of the person may be caught in the region. In other words, the controller 4 drives the components at low speeds so as to not to exceed the speed limit. The controller 4 lowers the operation speed of the component that reduces the region where the operator may be caught. In this example, the controller 4 limits the operation speed of the lower arm 12.

Referring to FIGS. 2 and 4, in the control of the present embodiment, a variable relating to the state in which the person is caught by the component of the robot 1 or the hand 2 is set in advance. This variable is calculated from the position of the component of the robot 1 on the drive axis. Moreover, the range of the variable in the state in which the person is caught by the component of the robot 1 or the hand 2 is set in advance. In the present embodiment, the determination range in which the person is caught is set in advance. The determination range is inputted to the controller 4 by the operator and is then stored in the storage unit 42.

The controller 4 includes a speed limiting unit 51 that limits the operation speed of the component driven on the drive axis. The speed limiting unit 51 includes a variable calculating unit 52 that calculates the variable regarding the determination of catching. Moreover, the speed limiting unit 51 includes a determination unit 53 that determines whether the variable obtained by the variable calculating unit 52 is within the determination range or not.

Referring to FIG. 4, in the first control, the joint angle between a predetermined reference direction and the direction of the component driven by the robot drive motor 22 is explained as the variable regarding the determination of catching. The predetermined reference direction is a horizontal direction indicated by arrow 92. An angle $\theta 2$ between the reference direction and the extension direction of the lower arm 12 is a joint angle at the second rotary axis 82. The angle $\theta 2$ is an angle between the reference direction and a line connecting the second rotary axis 82 and the third rotary axis 83. Alternatively, the angle $\theta 2$ is an angle between the axis of the lower arm 12 and the horizontal direction. For the joint angle, any direction can be set as a positive direction. In the example of FIG. 4, the angle $\theta 2$ has a positive value in an upward direction with respect to the reference direction.

The determination range relating to the angle $\theta 2$ is set in advance. For example, a range larger than the angle $\theta 2$ in FIG. 4 can be set as the determination range in which the person is caught. For example, the determination range can be set such that the angle $\theta 2$ is larger than +100°. Moreover, a range smaller than the angle $\theta 2$ in FIG. 5 can be set as the determination range in which the person is caught. For example, the determination range can be set such that the angle $\theta 2$ is smaller than −50°.

The variable calculating unit 52 obtains a rotation position at the drive axis from the output of the position detector 18. The variable calculating unit 52 of the speed limiting unit 51 calculates the angle $\theta 2$ based on the output of the position detector 18. The determination unit 53 determines whether or not the angle $\theta 2$ is within the determination range. If the angle $\theta 2$ is outside the determination range, the controller 4 continues a current motion of the robot 1. If the angle $\theta 2$ is within the determination range, the speed limiting unit 51 controls the rotation speed of the robot drive motor 22 corresponding to the second rotary axis 82 such that the rotation speed is set within a speed limit value. The speed limit value of the robot drive motor 22 corresponds to a speed limit of the component of the robot 1. The speed limit value of the robot drive motor 22 on each drive axis is determined in advance. The speed limit value is inputted to the controller 4 by the operator and is then stored in the storage unit 42.

The speed limiting unit 51 detects the rotation speed of the robot drive motor 22 corresponding to the second rotary axis 82. If the rotation speed of the robot drive motor 22 is higher than the speed limit value, a command for reducing the speed to the speed limit value or lower is transmitted to the motion control unit 43. For example, the speed limiting unit 51 transmits a command for reducing the rotation speed to the speed limit value to the motion control unit 43. The motion control unit 43 controls the rotation speed of the robot drive motor 22 to the speed limit value or lower based on the command. The rotation speed of the robot drive motor 22 is controlled to the speed limit value or lower, whereby the operation speed of the component of the robot 1 can be set at the speed limit or lower.

In this case, if components other than the lower arm 12 are driven, the operation speeds of the components other than the lower arm 12 can be also reduced according to the operation speed of the lower arm 12. For example, if the robot drive motor 22 of the third rotary axis 83 is driven to simultaneously drive the upper arm 11, the operation speed of the upper arm 11 may be limited in addition to the lower arm 12. Alternatively, only the operation speed of the lower arm 12 may be limited.

In this way, the controller 4 of the present embodiment can limit the operation speed of the component of the robot 1 when the robot 1 is positioned and oriented so as to catch the person. The robot 1 stops if the person is likely to be caught by the components of the robot 1. At this point, the operation speed of the component of the robot 1 is limited, thereby the movement length of the component by inertia is made to be short. As a result, the influence on the occurrence of catching can be reduced. In other words, the robot device 5 of the present embodiment can suppress that the space where the person is caught after the stop command is issued is reduced, thereby the safety is improved.

In the above example, it is determined whether or not the person is caught, based on the joint angle relating to the second rotary axis 82. The similar control can be performed with respect to other drive axis. Subsequently, a control example of the drive axes other than the second rotary axis 82 will be discussed below.

Figure 6:
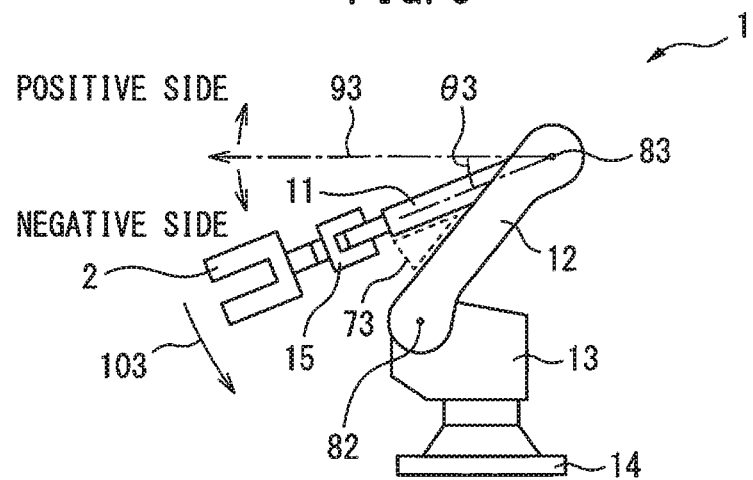
FIG. 6 is a fourth schematic side view showing the robot in the first robot device.
Figure 7:
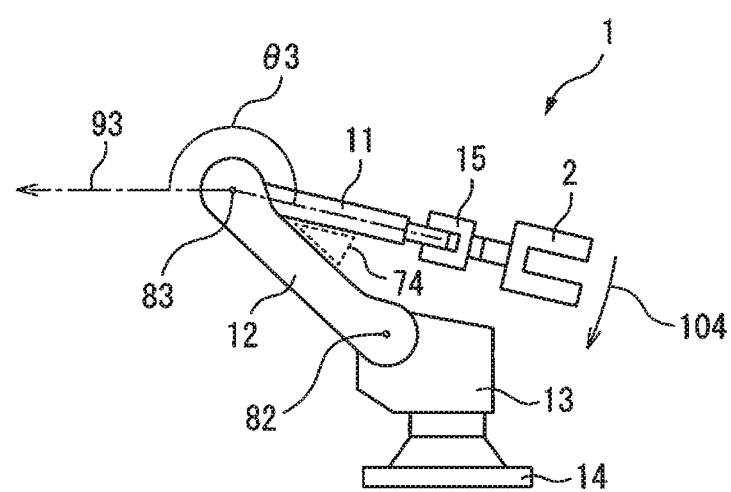
FIG. 7 is a fifth schematic side view showing the robot in the first robot device.

FIG. 6 is a fourth schematic side view showing the robot in the first robot device according to the present embodiment. FIG. 7 is a fifth schematic side view showing the robot in the first robot device. In this example, the operator is caught by the robot 1 when the upper arm 11 is driven around the third rotary axis 83 serving as the J3 axis. As shown in FIG. 6, the upper arm 11 pivots about the third rotary axis 83 as indicated by arrow 103. At this point, when the angle between the upper arm 11 and the lower arm 12 decreases, the hand of the operator is liable to be caught in region 73. Alternatively, as shown in FIG. 7, the upper arm 11 pivots to the opposite side. When the upper arm 11 is driven as indicated by arrow 104, the hand of the operator may be caught in region 74 between the upper arm 11 and the lower arm 12.

The joint angle at the third rotary axis 83 is set with respect to the horizontal direction indicated as a reference direction by arrow 93. The joint angle is an angle $\theta 3$ between the reference direction indicated by arrow 93 and the direction in which the upper arm 11 extends (the direction of a line connecting the second rotary axis 82 and the third rotary axis 83). In this example, the angle $\theta 3$ has a positive value in an upward direction with respect to the reference direction. The angle $\theta 3$ can be used as the variable regarding the occurrence of catching of the person. Moreover, the determination range in which the person is caught can be determined in advance for the angle $\theta 3$. For example, referring to FIG. 6, a range where the angle $\theta 3$ is smaller than −30° can be set as the determination range in which the person is caught. Furthermore, referring to FIG. 7, a range where the angle $\theta 3$ is larger than +90° can be set as the determination range in which the person is caught.

Referring to FIGS. 2, 6, and 7, the speed limiting unit 51 calculates the angle $\theta 3$ from the output of the position detector 18 attached to the robot drive motor 22 corresponding to the third rotary axis 83. If the angle $\theta 3$ is within the determination range, the speed limiting unit 51 limits the rotation speed of the robot drive motor 22 corresponding to the third rotary axis 83 such that the operation speed of the upper arm 11 is set at the speed limit or lower. The motion control unit 43 can control the rotation speed of the robot drive motor 22 of the third rotary axis 83 to the speed limit value or lower.

Figure 8:
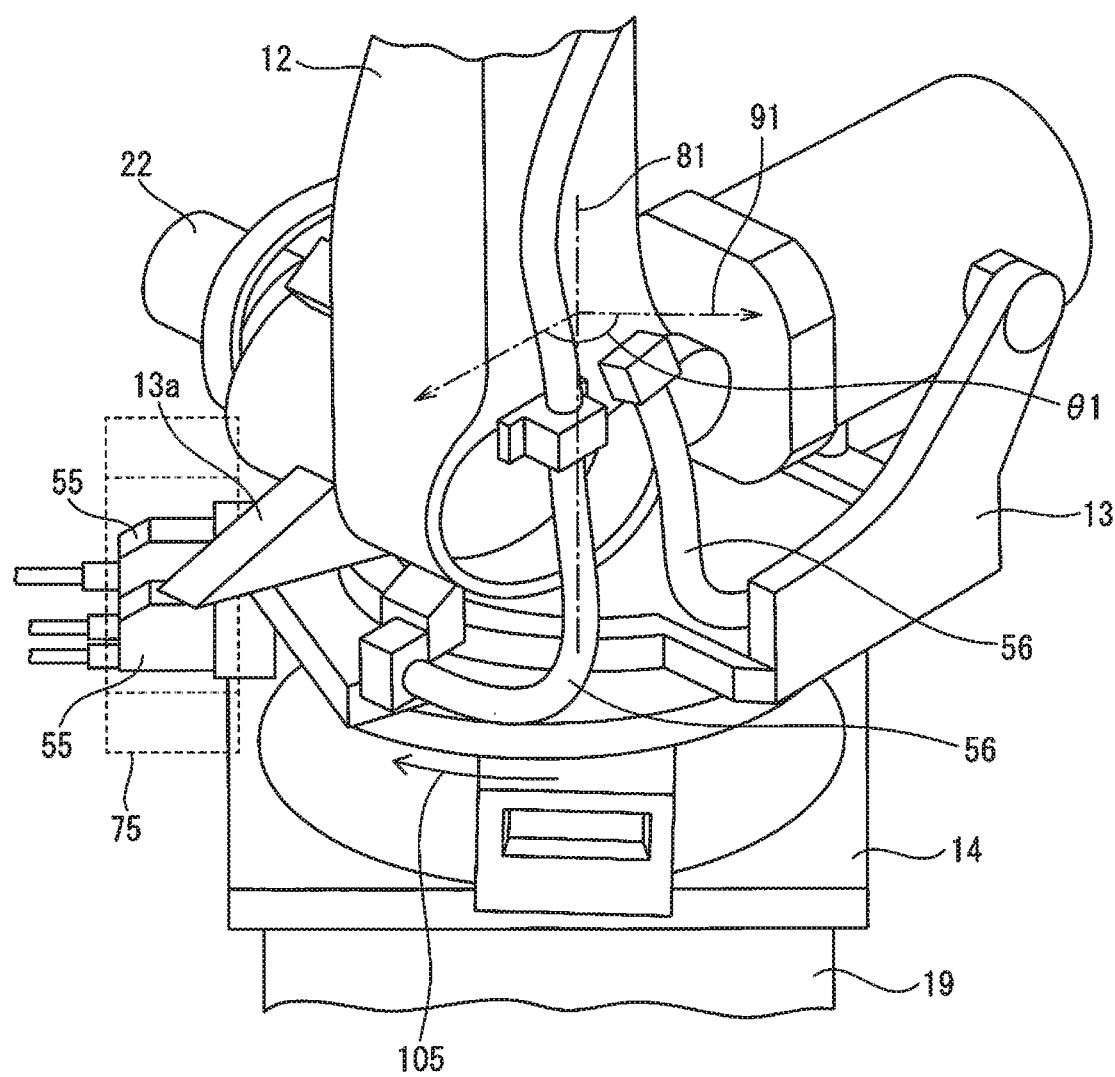
FIG. 8 is an enlarged perspective view showing a base and a rotation base in the first robot device.

FIG. 8 is an enlarged perspective view showing the base and the rotation base of the robot. In the following example, the operator is caught by the robot 1 when the rotation base 13 is driven. In this case, the operator is caught by the components of the robot 1 when the rotation base 13 rotates about the first rotary axis $\theta 1$ serving as the J1 axis.

In the example of FIG. 8, the rotation base 13 has a protrusion part 13a that protrudes to the outside. Moreover, the base 14 also has an externally protruding part. A connector 55 for connecting an electric cable is disposed on the base 14. The rotation base 13 pivots about the first rotary axis 81 as indicated by arrow 105. At this point, in the presence of a foot of the operator in region 75, the foot of the operator is liable to be caught by the protruding part 13a and the connector 55.

With respect to the first rotary axis 81, the angle $\theta 1$ between the predetermined reference direction and the direction of the rotation base 13 serves as the joint angle. The angle $\theta 1$ can be set as a variable regarding the occurrence of catching of the person. The reference direction is a direction indicated by arrow 91. The angle $\theta 1$ is set by the reference direction and the direction in which a predetermined point on the rotation base 13 faces. Moreover, on the first rotary axis 81, the determination range in which the person is caught with respect to the angle $\theta 1$ and the speed limit value of the robot drive motor 22 can be set in advance.

Referring to FIGS. 2 and 8, the speed limiting unit 51 calculates the angle $\theta 1$ from the output of the position detector 18 attached to the robot drive motor 22 corresponding to the first rotary axis 81. If the angle $\theta 1$ is within the determination range, the speed limiting unit 51 limits the rotation speed of the robot drive motor 22 corresponding to the first rotary axis 81 such that the operation speed of the rotation base 13 is set at the speed limit or lower. The speed limiting unit 51 can control the rotation speed of the robot drive motor 22 to a speed limit value for the first rotary axis 81 or lower.

The robot 1 is provided with an electric cable for supplying electric power to the robot drive motor 22 and a signal line for transmitting an electric signal. Moreover, a drive mechanism for an operation tool may require electric power supply or air supply. The electric cable for supplying electric power, an air pipe, and a wire or the like for supplying the electric signal are referred to as linear members. Such linear members may be disposed on the rotation base 13. In the example of FIG. 8, an electric cable 56 is disposed on the base 13. A part of the electric cable 56 extends in the lateral direction. The operator may be caught by the linear member and the component on the base 14. In this case, the determination range for the corresponding angle θ1 may be set so as to perform the control.

Alternatively, the robot drive motor 22 corresponding to the first rotary axis 81 and the robot drive motor 22 corresponding to the second rotary axis 82 may be disposed on the rotation base 13. The operator may be caught by the components of the robot drive motor 22 and the base 14. In this case, the determination range for the corresponding angle θ1 may be set so as to perform the control.

As described above, the operator is not caught by the components in a single state, but may be caught in two or more states. Thus, a plurality of the determination ranges may be set. The range in which the operator may be caught by any components of the robot 1 can be set as determination range.

Figure 9:
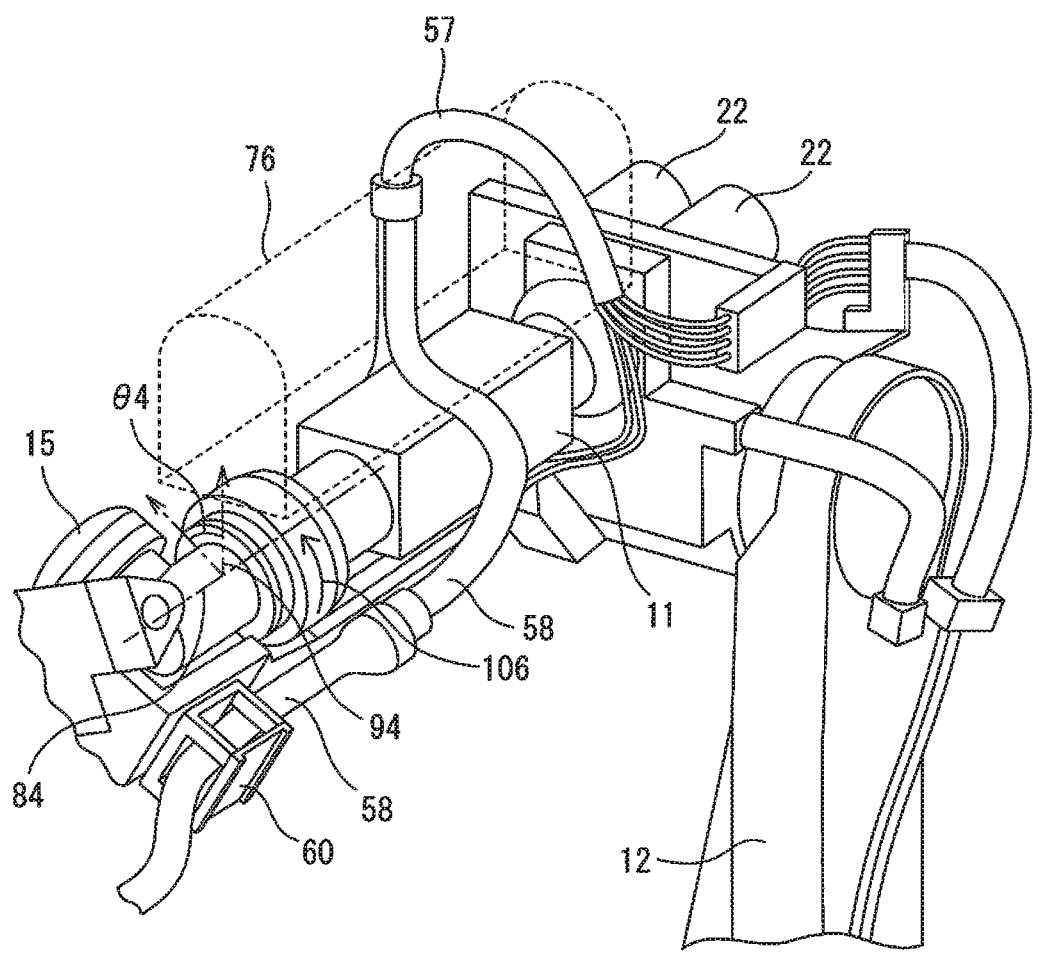
FIG. 9 is an enlarged perspective view showing an upper arm in the first robot device.

FIG. 9 is an enlarged perspective view showing the upper arm of the robot. Subsequently, in the following example, the case in which the operator is caught by the robot 1 when the upper arm 11 rotates about the fourth rotary axis 84 serving as the J4 axis will be explained.

In some cases, the robot drive motor 22 disposed in the upper part of the robot 1 and etc. is provided with the linear member such as the electric cable for supplying electric power and the signal line. In the example of FIG. 9, an electric cable 57 is fixed to a non-rotating part of the upper arm 11 around the fourth rotary axis 84. Moreover, an electric cable 58 is fixed to the wrist 15 with a fixing member 60. When one end of the upper arm 11 rotates in the direction as indicated by arrow 106, a part of the electric cable 58 moves. At this point, if an arm of the operator is present in region 76 surrounded by the electric cable 57, the arm is liable to be caught by the electric cable 57 and the electric cable 58.

For the fourth rotary axis 84, an angle θ4 can be set as the joint angle. A reference direction indicated by arrow 94 can be set, and the direction in which a predetermined set point on the upper arm 11 or the wrist 15 faces can be set. The angle θ4 can be set between the reference direction and the direction in which the set point faces. Moreover, the determination range of the angle θ4 and the speed limit value of the robot drive motor 22 with respect to the fourth rotary axis 84 can be set. For example, when one end of the upper arm 11 rotates about the fourth rotary axis 84 in the direction as indicated by the arrow 106, a part of the electric cable 58 moves upward. The range of the angle θ4 in which a part of the electric cable 58 is placed in the region 76 can be set as a determination range. If the angle θ4 is within the determination range, the operation speed of the wrist 15 that rotates about the fourth rotary axis 84 can be limited to the speed limit or lower.

Figure 10:
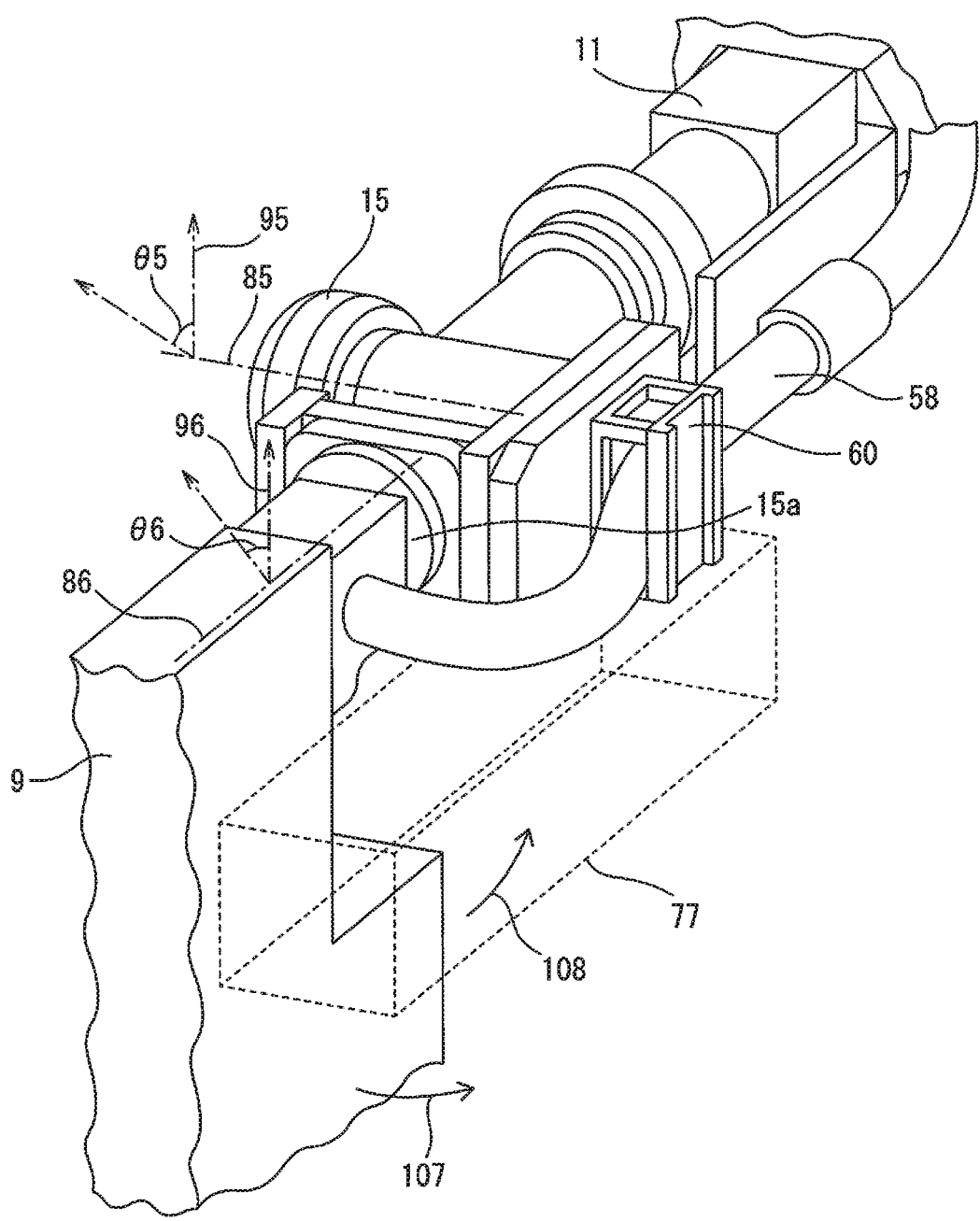
FIG. 10 is an enlarged perspective view showing the upper arm and a hand in the first robot device.

FIG. 10 is an enlarged perspective view showing the upper arm, the wrist, and the hand. In the following example, the flange 15a of the wrist 15 rotates about the sixth rotary axis 86 serving as the J6 axis, whereby the operator is caught by the robot 1 and the hand 9.

The hand 9 in FIG. 10 extends in the direction that is perpendicular to the sixth rotary axis 86. The hand 9 rotates about the sixth rotary axis 86. If an arm of the operator is present in a region 77 when the hand 9 rotates as indicated by arrow 107, the arm of the operator may be caught by the hand 9 and the fixing member 60.

Also for the sixth rotary axis 86, an angle θ6 can be set as the joint angle. A reference direction indicated by arrow 96 and the direction in which a predetermined set point on the flange 15a faces are set. The angle θ6 can be determined between the reference direction and the direction in which the set point faces. Moreover, the determination range with respect to the angle θ6 and the speed limit value of the robot drive motor 22 with respect to the sixth rotary axis 86 can be set. For example, the range of the angle θ6 that places the hand 9 in the region 77 can be set as the determination range. If the angle θ6 is within the determination range, the operation speed of the hand 9 that rotates about the sixth rotary axis 86 can be limited to the speed limit or lower.

In the following example for explanation, the flange 15a of the wrist 15 rotates about the fifth rotary axis 85 serving as the J5 axis, whereby the operator is caught by the robot 1 and the hand 2. The flange 15a of the wrist 15 rotates about the fifth rotary axis 85. If the hand 9 rotates as indicated by arrow 108, the arm of the operator may be caught in the region between the hand 9 and the wrist 15.

For the fifth rotary axis 85, an angle θ5 can be set as the joint angle. A predetermined reference direction indicated by arrow 95 and the direction in which a predetermined set point on the wrist 15 faces can be set. The angle θ5 can be determined between the reference direction and the direction in which the set point faces. Moreover, the determination range of the angle θ5 and the speed limit value of the robot drive motor 22 with respect to the fifth rotary axis 85 can be set. If the angle θ5 is within the determination range, the operation speed of the hand 9 that rotates about the fifth rotary axis 85 can be limited to the speed limit or lower.

In this way, the position and posture of the robot in which the operator is caught can be determined based on the respective joint angles of the rotary axes. If the operator is liable to be caught, the operation speeds of the component of the robot can be limited. For example, the determination ranges and the speed limit values with respect to the rotary axes can be set as indicated by Table 1 below. The upper limit value and lower limit value for each drive axis can be stored in the storage unit 42. In this regards, the upper limit value and the lower limit value correspond to the maximum value and the minimum value of a safe range where the person is not caught by the robot. As has been discussed, a plurality of determination ranges may be set for each of the drive axes.

TABLE 1

| | Drive axis | | | | | |
|---|---|---|---|---|---|---|
| | J1 | J2 | J3 | J4 | J5 | J6 |
| Upper limit value Un | +90° | +100° | +90° | +90° | +90° | +90° |
| Lower limit value Ln | −90° | −50° | −30° | −90° | −90° | −90° |
| Speed limit value Sn [deg/s] | 10 | 20 | 20 | 10 | 10 | 10 |

In Table 1, each of the drive axes is numbered as n, and the upper limit values Un and lower limit values Ln of the joint angles are set for the drive axes. A range above the upper limit value or below the lower limit value is the determination range in which the person is likely to be caught. Moreover, a speed limit value Sn for limiting the rotation speed of the robot drive motor 22 is set. These set values can be inputted to the controller 4 in advance by the operator.

Figure 11:
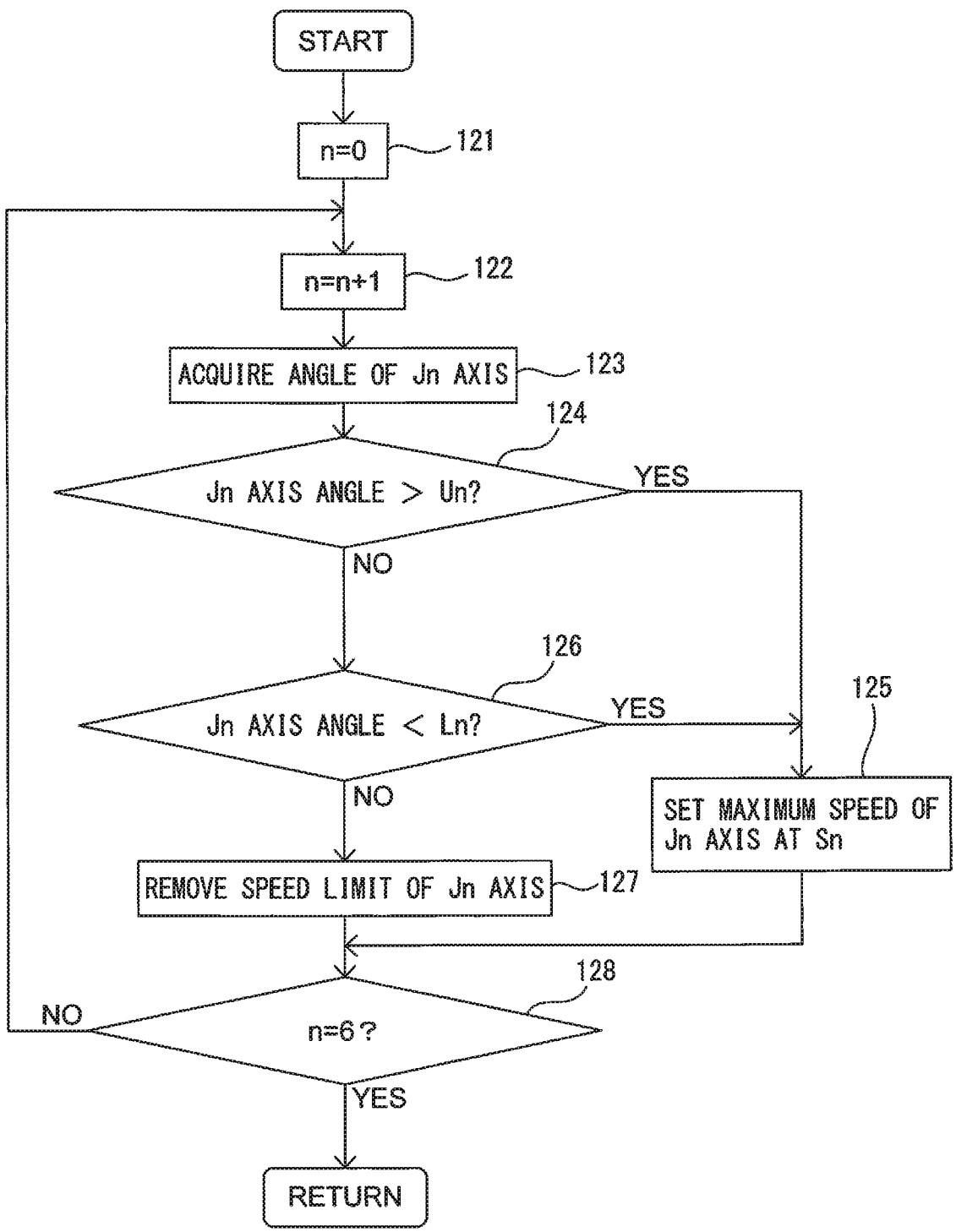
FIG. 11 is a flowchart showing a first control according to the embodiment.

FIG. 11 is a flowchart showing the first control according to the present embodiment. The control in FIG. 11 can be performed in a period during which the robot 1 is driven based on the motion program 41. Furthermore, the control in FIG. 11 can be repeated at predetermined time intervals.

Referring to FIGS. 2 and 11, in step 121, the number n of the rotary axis is set to 0. Then, in step 122, 1 is added to number n of the rotary axis. In this case, number n of the rotary axis is 1.

In step 123, the variable calculating unit 52 acquires the angle θn regarding the occurrence of catching on the Jn axis. The variable calculating unit 52 acquires the output of the position detector 18 of the robot drive motor 22 for the Jn axis. Moreover, the variable calculating unit 52 can calculate the angle θn of the Jn axis. For example, if number n is 1, the variable calculating unit 52 calculates the angle θ1 shown in FIG. 8.

In step 124 and step 125, it is determined whether or not the angle θn is within the determination range. The determination unit 53 determines whether or not the angle θn of the Jn axis is larger than the upper limit value Un. In step 124, if the angle θn is larger than the upper limit value Un, it can be determined that the operator may be caught by the component driven on the Jn axis. In this case, the control advances to step 125.

In step 125, the determination unit 53 sets the maximum speed of the robot drive motor 22 of the Jn axis at the speed limit value Sn. The speed limit value Sn is determined for each of the rotary axes. The speed limiting unit 51 transmits the speed limit value Sn for the Jn axis to the motion control unit 43. If the maximum speed of the robot drive motor 22 of the Jn axis is higher than the speed limit value Sn, the motion control unit 43 controls the maximum speed of the robot drive motor 22 of the Jn axis to the speed limit value Sn or lower.

In step 124, if the angle θn of the Jn axis is not larger than the upper limit value Un, the control advances to step 126. In step 126, the determination unit 53 determines whether or not the angle θn of the Jn axis is smaller than the lower limit value Ln. In step 126, if the angle θn is smaller than the upper limit value Un, it can be determined that the operator may be caught by the component driven by the Jn axis. In this case, the control advances to step 125.

In step 126, if the angle θn of the axis Jn is not smaller than the lower limit value Ln, it can be determined that the angle θn of the Jn axis is within a safe range where the operator is not liable to be caught by the robot. In this case, the control advances to step 127.

In step 127, if the speed limit value Sn is set for the robot drive motor 22 of the Jn axis, the speed limit value is removed. In other words, the control of the speed limit can be stopped. The determination unit 53 transmits the removal of the speed limit to the motion control unit 43. In this case, the rotation speed of the robot drive motor 22 of the Jn axis reaches a speed determined by the motion program 41. For example, the motion control unit 43 increases the rotation speed to the speed determined by the motion program 41.

Then, the control advances to step 128. In step 128, it is determined whether or not the number n has reached 6 that is the maximum value. Since the robot 1 of the present embodiment has six drive axes, the maximum value is 6.

In step 128, if the number n has not reached 6, the control advances to step 122. In step 122, the number of the subsequent rotary axis is set. Then, from step 123 to step 127, the joint angle of the subsequent rotary axis is determined.

In step 128, if the number n is 6, determination is completed for all the drive axes. Thus, the control is terminated. In this way, in the first control of the present embodiment, the angle regarding the occurrence of catching is determined for each of the drive axes. If the angle regarding the occurrence of catching is within the determination range, the speed limit of the component is set. If the speed of the current component is higher than the speed limit, the controller 4 can reduce the speed to the speed limit or lower.

In the above-mentioned control, if the joint angle of the drive axis is within the determination range, the speed of the robot drive motor of the drive axis is limited, but the embodiment is not limited to this. The rotation speeds of the robot drive motors of other drive axes may be limited instead. For example, if the joint angle of one of the drive axes is within the determination range, the rotation speeds of the robot drive motors of all the drive axes may be limited.

The above-mentioned control is performed when the drive axis number n is 0 to the maximum value. In other words, it is determined whether or not the operator is likely to be caught for all the drive axes. The control is not limited to this embodiment and a determination can be made for any one of the drive axes. For example, only one of the drive axes may be controlled.

Figure 12:
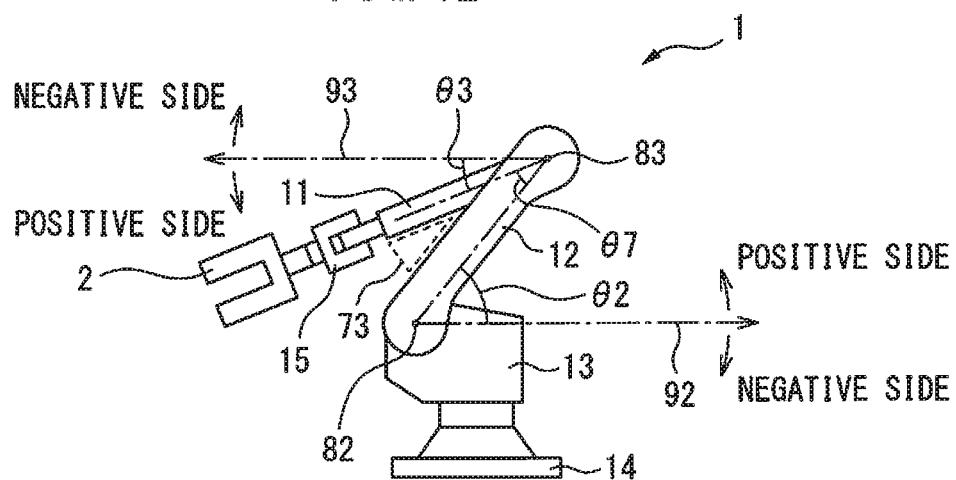
FIG. 12 is a sixth schematic side view showing the robot in the first robot device.

FIG. 12 is a sixth schematic side view showing the robot in the first robot device. Subsequently, the second control of the present embodiment will be described below. In this example, as indicated by arrow 92, the reference direction for the second rotary axis 82 is set to the horizontal direction. Moreover, as indicated by arrow 93, the reference direction for the third rotary axis 83 is set to the horizontal direction.

In the first control, it is determined whether or not the operator is likely to be caught based on the single rotary axis. The size of the region where the operator is caught depends on the angle between the two components connected to the single rotary axis. The joint angle for each of the first rotary axis 81, the second rotary axis 82, the fourth rotary axis 84, the fifth rotary axis 85, and the sixth rotary axis 86 is the angle between the two components connected to the single rotary axis.

In this case, the size of the region 73 for the third rotary axis 83 depends on the orientation of the lower arm 12 in addition to the orientation of the upper arm 11. In other words, the size of the region 73 depends not only on the angle θ3 for the third rotary axis 83 but also the angle θ2 for the second rotary axis 82. When the angle θ2 for the second rotary axis 82 changes, the angle θ3 for the third rotary axis 83 changes. A joint angle at one of the rotary axes is changed so as to change joint angle at another rotary axis. In some cases, the angle θ3 for the third rotary axis 83 may be changed in synchronization with a change of the angle θ2 for the second rotary axis 82. In the second control of the present embodiment, whether the operator is likely to be caught is determined based on the joint angles at the multiple drive axes.

Referring to FIGS. 2 and 12, in the second control, the variable calculating unit 52 of the speed limiting unit 51 calculates the angle θ7 between the two components connected to the single rotary axis based on the joint angles of the multiple rotary axes. The variable calculating unit 52 calculates the angle formed by the two adjacent components. The angle θ7 between the two components serves as a variable regarding the occurrence of catching of the operator.

The variable calculating unit 52 acquires the output of the position detector 18 attached to the robot drive motor 22 corresponding to the second rotary axis 82, and calculates the angle θ2. Similarly, the variable calculating unit 52 acquires the output of the position detector 18 attached to the robot drive motor 22 corresponding to the third rotary axis 83, and calculates the angle θ3. The angle θ2 and the angle θ3 are joint angles. As shown in FIG. 12, the positive side and the negative side are set for each of the angles θ2 and θ3.

The angle θ7 between the upper arm 11 and the lower arm 12 can be calculated by subtracting the angle θ3 for the third rotary axis 83 from the angle θ2 for the second rotary axis 82.

Figure 13:
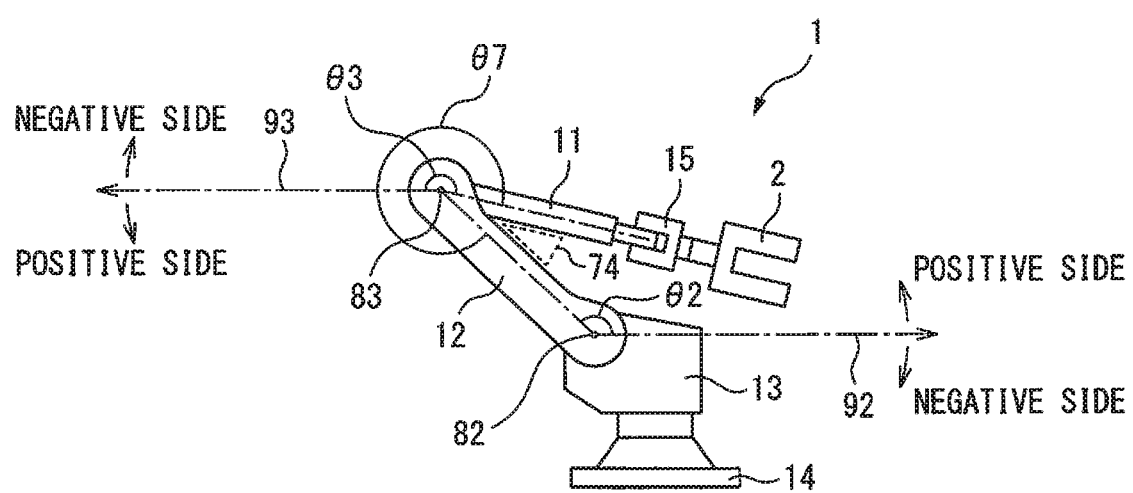
FIG. 13 is a seventh schematic side view showing the robot in the first robot device.

FIG. 13 is a seventh schematic side view showing the robot in the first robot device. FIG. 13 shows that the upper arm 11 has pivoted oppositely from the state indicated in FIG. 12. In this case, the angle θ3 for the third rotary axis 83 has a negative value. Thus, the angle θ7 between the upper arm 11 and the lower arm 12 can be calculated by subtracting the angle θ3 for the third rotary axis 83 from the angle θ2 for the second rotary axis 82.

The operator can set the determination range for the angle θ7 in advance. For example, the determination range for the angle θ7 can be set such that the angle θ7 is smaller than that in a state shown in FIG. 12. For example, the determination range can be set such that the angle θ7 is smaller than 30°. Alternatively, the operator can set the determination range for the angle θ7 such that the angle θ7 is larger than that in a state shown in FIG. 13. For example, the determination range can be set such that the angle θ7 is larger than 220°. Moreover, the speed limit value of the robot drive motor 22 on the third rotary axis 83 can be set in advance. The determination unit 53 of the speed limiting unit 51 can determine whether or not the calculated angle θ7 is within the determination range. If the angle θ7 is within the determination range, the speed limiting unit 51 can limit the operation speed of the upper arm 11 to the speed limit or lower. If the lower arm 12 is simultaneously driven, the speed limiting unit 51 can limit the operation speed of the lower arm 12 to the speed limit or lower.

Figure 14:
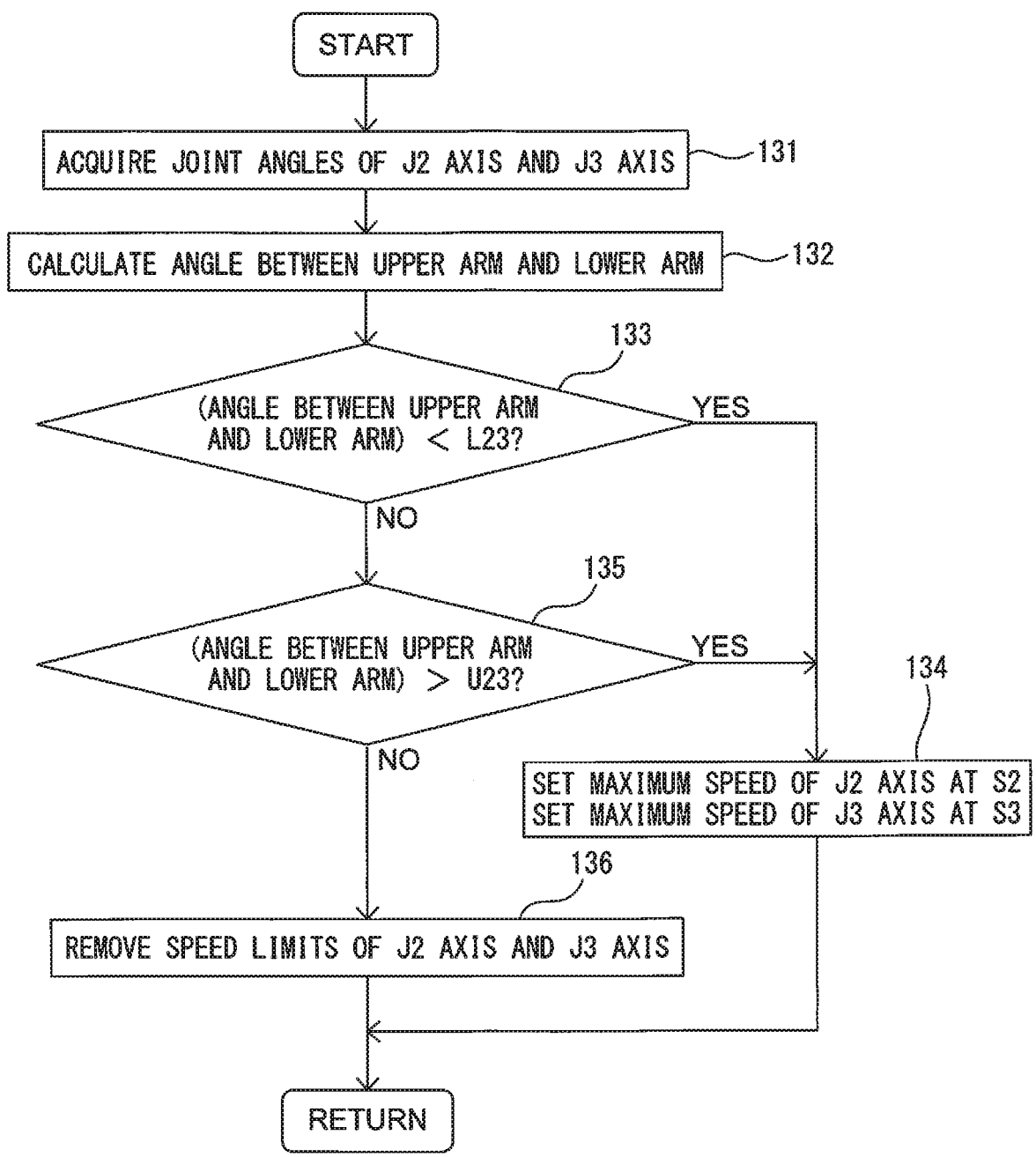
FIG. 14 is a flowchart showing a second control according to the embodiment.

FIG. 14 is a flowchart showing the second control according to the present embodiment. The control in FIG. 14 can be performed in a period during which the robot 1 is driven based on the motion program 41. Furthermore, the control in FIG. 14 can be repeated at predetermined time intervals.

Referring to FIGS. 2 and 14, in step 131, the variable calculating unit 52 of the speed limiting unit 51 acquires the angle θ2 for the second rotary axis 82 and the angle θ3 for the third rotary axis 83 based on the outputs of the position detectors 18.

In step 132, the variable calculating unit 52 calculates the angle θ7 between the upper arm 11 and the lower arm 12. In the example of FIGS. 12 and 13, the variable calculating unit 52 calculates the angle θ7 by subtracting the angle θ3 from the angle θ2.

In step 133, the determination unit 53 determines whether or not the angle θ7 between the upper arm 11 and the lower arm 12 is smaller than a lower limit value L23. In this determination, for example, in the state of FIG. 12, it is determined whether or not the operator is likely to be caught in the region 73 is determined. In step 133, if the angle θ7 is smaller than the lower limit value L23, it can be determined that the operator is likely to be caught in the region 73 between the upper arm 11 and the lower arm 12. In this case, the control advances to step 134.

In step 134, the determination unit 53 sets the maximum speed of the robot drive motor 22 of the second rotary axis 82 at a speed limit value S2. Moreover, the determination unit 53 sets the maximum speed of the robot drive motor 22 of the third rotary axis 83 at a speed limit value S3. In this way, the maximum speeds can be set for the respective drive axes. The speed limiting unit 51 transmits a command to the motion control unit 43 so as to reduce the maximum speed of the robot drive motor 22 of the second rotary axis 82 to the speed limit value S2 or lower. The speed limiting unit 51 transmits a command to the motion control unit 43 so as to reduce the maximum speed of the robot drive motor 22 of the third rotary axis 83 to the speed limit value S3 or lower. The motion control unit 43 controls the robot drive motors 22 so as to reduce the rotation speeds of the robot drive motors 22 of the respective rotary axes to the speed limit values or lower. The operation speed of the upper arm 11 and the operation speed of the lower arm 12 are reduced to the respective speed limits or lower.

In step 133, if the angle θ7 between the upper arm 11 and the lower arm 12 is not smaller than the lower limit value L23, the control advances to step 135. In step 135, the determination unit 53 determines whether or not the angle θ7 is larger than an upper limit value U23. In this determination, for example, it is determined whether or not the operator is likely to be caught in the region 74 in the state of FIG. 13.

In step 135, if the angle θ7 is larger than the upper limit value U23, the determination unit 53 can determine that the operator is likely to be caught in the region 74 between the upper arm 11 and the lower arm 12. In this case, the control advances to step 134. In step 135, if the angle θ7 is not larger than the upper limit value U23, the determination unit 53 can determine that the operator is unlikely to be caught between the upper arm 11 and the lower arm 12. In this case, the control advances to step 136.

In step 136, the speed limits of the second rotary axis 82 and the third rotary axis 83 are removed. If the speed limits of the second rotary axis 82 and the third rotary axis 83 are not set, the current state is maintained.

As described above, in the second control, the components of the robot 1 by which the operator is caught are the two arms connected to the single rotary axis. The variable for a state in which the person is caught is the angle between the two arms connected to the single rotary axis. The speed limiting unit 51 acquires the joint angle between the reference direction which is determined in advance and the direction in which the arm extends based on the position of the component on the drive axis. The speed limiting unit 51 calculates the angle between the two arms connected to the rotary axis by adding or subtracting the joint angles of the two arms. By adopting this control, the size of a space between the two arms can be precisely determined when the single rotary axis is driven so as to change the joint angle of another rotary axis. In other words, it is determined whether or not the operator is likely to be caught between the two arms can be precisely determined.

Figure 15:
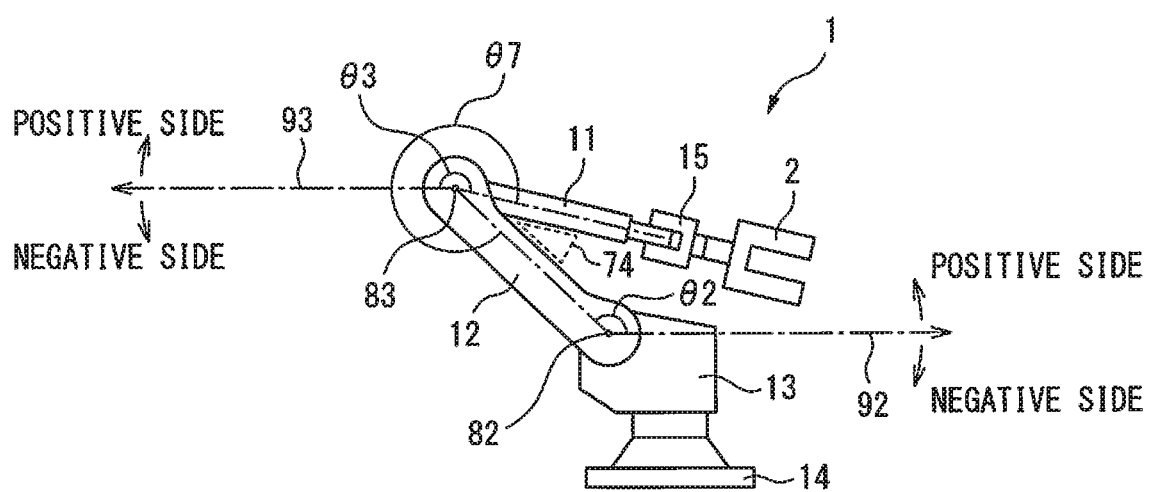
FIG. 15 is an eighth schematic side view showing the robot in the first robot device.

FIG. 15 is an eighth schematic side view showing the robot in the first robot device. In the above control, the angle between the two arms connected to the single rotary axis is acquired by subtracting the joint angle of one of the rotary axes from the joint angle of the other rotary axis, but the embodiment is not limited to this. If the angle between the two arms is calculated, the joint angles of the two rotary axes may be added depending on the method for setting the joint angle. In the example of FIG. 15, the upper side with respect to the reference direction indicated by arrow 93 is set as the positive side of the angle θ3 for the third rotary axis 83. In this case, the angle θ3 has a negative value. Thus, the angle θ7 between the upper arm 11 and the lower arm 12 can be acquired by adding the angle θ2 and the angle θ3.

In the present embodiment, the angle between the upper arm 11 and the lower 12 was described, but the embodiment is not limited to this. The second control is applicable to a robot that changes the joint angle of another component by changing the joint angle of one component. For example, there is a robot that has seven rotary axes.

In this case, the robot has three arms that are driven by a second rotary axis, a third rotary axis, and a fourth rotary axis, respectively. The second control is applicable to calculation of the angle between the arm driven by the third rotary axis and the arm driven by the fourth rotary axis. In the second control, the variable calculating unit calculates the angle between the two components by adding or subtracting the two joint angles, but the embodiment is not limited to this. The variable calculating unit may calculate the angle between the two components by adding or subtracting at least three joint angles.

In the examples of the first control and the second control, the operator is caught by the two components of the robot and the operator is caught by the components of the robot and the hand, but the embodiment is not limited to these examples. The similar control can be performed when the operator is caught between the components of the robot or the hand and an object disposed around the robot device. For example, when a conveyor for conveying workpieces is disposed around the robot device, the operator may be caught between the robot and the conveyor. In this robot device, a variable based on joint angle and the determination range of the variable in a state where the operator is caught between the robot and the conveyor can be set. If the variable is within the determination range, the operation speed of the robot drive motor can be limited.

Figure 16:
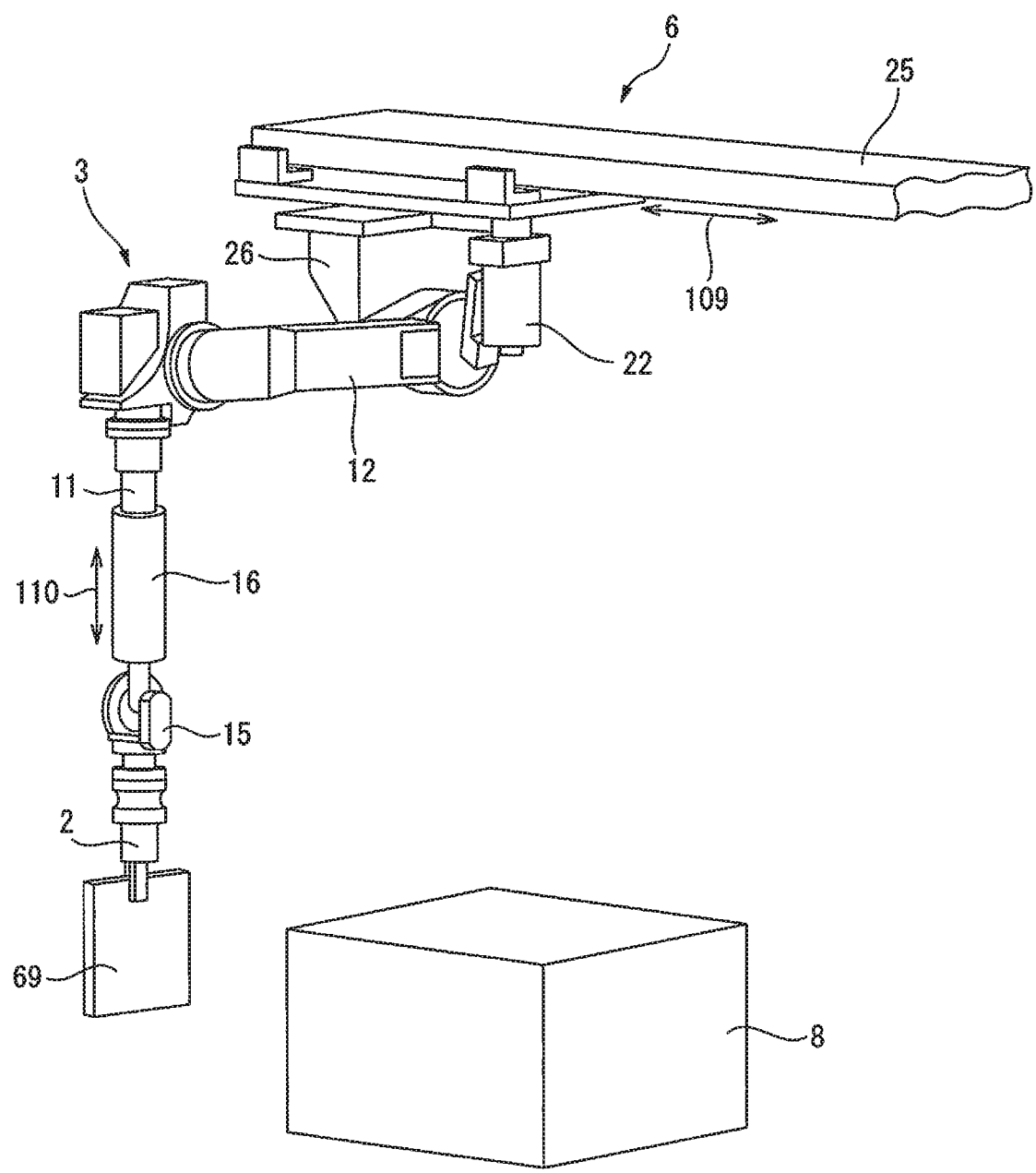
FIG. 16 is a schematic perspective view showing a second robot device according to the embodiment.

FIG. 16 is a schematic perspective view showing a second robot device according to the present embodiment. A second robot device 6 includes a robot 3 having a linear axis. A first drive axis of the robot 3 is a linear axis. The robot 3 includes a guide rail 25 extending in one direction. The robot 3 includes a movement base 26 that moves along the guide rail 25. A robot drive device includes a robot drive motor 22 that drives the movement base 26. The movement base 26 linearly moves in a direction indicated by an arrow 109.

The robot 3 includes a lower arm 12, an upper arm 11, and an extension arm 16 connected to the upper arm 11. As indicated by arrow 110, the extension arm 16 moves in the direction in which the upper arm 11 extends. The extension arm 16 moves relative to the upper arm 11. The extension arm 16 moves in one direction by the linear axis. The robot drive device includes the robot drive motor 22 that drives the extension arm 16. The extension arm 16 moves in the direction in which the upper arm 11 extends such that the length of the arm is increased or reduced.

The present invention is also applicable to the robot that includes the linear axis as a drive axis for driving components. For example, a work table 8 for a task of the robot 3 may be placed near the robot 3. The components of the robot 3 or the hand 2 is close to the work table 8 by movement of the movement base 26. Alternatively, when the extension arm 16 is driven to extend, the components of the robot 3 or the hand 2 may be brought close to the work table 8. At this point, the operator may be caught by the components of the robot 3 and the work table 8. Alternatively, the operator may be caught by the hand 2 and the work table 8.

A controller 4 can calculate variables regarding the occurrence of catching based on the positions of the components on the linear shaft. For example, the position of the movement base 26 on a first linear axis can be set as the variable. Furthermore, the determination range of the variable can be set for a state where the person is likely to be caught by the robot. A speed limit value can be set for the operation speed of the robot drive motor 22 that drives the movement base 26 in accordance with the case in which the variable is within the determination range. Alternatively, a speed limit value can be set for the rotation speed of the robot drive motor 22 that drives the extension arm 16. If the variable is within the determination range, the controller 4 can control the operation speeds of the movement base 26 and the operation speed of the extension arm 16 to the speed limits or lower.

In the present embodiment, the determination range for the occurrence of catching of the person is set for determining whether or not the person is likely to be caught by the robot, but the embodiment is not limited to this. The determination range may be a safe range where the person is not caught by the robot. If the variable is within the range of a state where the person is caught by the robot or the hand, the speed limiting unit can control the operation speed of the component to the speed limit or lower.

In the robot device that allows collaboration with the operator, the robot may perform the operation alone. If the robot performs the operation alone, the operator is separated from the robot. The controller can perform a collaboration control in which the operation is simultaneously performed by the operator and the robot and a quick control in which the operation is performed by the robot alone. The controller can be formed so as to switch collaboration control or quick control. In the quick control, it is possible to stop the control for stopping the robot when the operator comes into contact with the robot. Moreover, in the quick control, it is possible to prohibit the control for reducing the operation speed of the component according to the present embodiment. Thus, the quick control enables a high-speed operation in the absence of the person near the robot.

In the present embodiment, an articulated robot was described as an example, but the embodiment is not limited to this. The present invention is applicable to a controller that controls any robot.

According to an aspect of the present disclosure, a robot controller can be provided that suppresses influence on the operator when the operator is caught by the motion of the components of the robot or the hand.

In the forgoing control, the order of steps can be optionally changed as long as the functions and effects are not modified. The foregoing embodiment can be optionally combined with another. In the drawings, the same or equivalent parts are indicated by the same reference numerals. The foregoing embodiment is merely exemplary and does not limit the invention. The embodiment includes the modifications indicated in the claims.

The invention claimed is:

1. A controller for controlling a robot including drive axis for driving a component of the robot and a position detector for detecting a position on the drive axis, the controller comprising:
   a stop command unit for stopping a motion of the robot when a person comes into contact with the robot; and
   a speed limiting unit for limiting an operation speed of the component driven on the drive axis, wherein
   the controller is configured to switch between
       a collaboration control in which the robot performs an operation in collaboration with the person and
       a quick control in which the robot performs the operation alone without performing the operation in collaboration with the person, a variable calculated from the position of the component on the drive axis and a range of the variable for a state where the person is caught by the robot or an operation tool attached to the robot are determined in advance, in the collaboration control, the speed limiting unit acquires the position of the component on the drive axis from the output of the position detector, acquires the variable based on the position of the component on the drive axis, and controls the operation speed of the component to a predetermined speed limit or lower if the variable is within the range, and in the quick control, the controller prohibits a control in which the speed limiting unit controls the operation speed of the component to the predetermined speed limit or lower if the variable is within the range.

2. The controller according to claim 1, wherein the drive axis is a rotary axis for rotating the component, the variable is a joint angle between a predetermined reference direction and a direction of the component, and the speed limiting unit controls the operation speed of the component driven on the rotary axis to a predetermined speed limit or lower if the joint angle at the rotary axis is within the range.

3. The controller according to claim 1, wherein the drive axis is a rotary axis for rotating the component, the variable is an angle between the two components connected to the single rotary axis, and the speed limiting unit calculates the angle between the two components connected to the rotary axis and controls the operation speed of the component driven on the rotary axis to a predetermined speed limit or lower if the angle is within the range.

4. The controller according to claim 3, wherein the components are two arms connected to the single rotary axis, the variable is an angle between the two arms connected to the single rotary axis, and the speed limiting unit acquires joint angles between a predetermined reference direction and an direction in which the arm extends based on a position of the component on the drive axis, and calculates an angle between the two arms connected to the rotary axis by adding or subtracting the joint angles of the two arms.

5. The controller according to claim 1, wherein the range is a range in which the person is caught by the robot and an object disposed around the robot.

* * * * *